United States Patent Office 3,494,845
Patented Feb. 10, 1970

3,494,845
METHOD OF PREPARING SATURATED POLYMERS OF SIMPLE HALOCARBONS IN A CORONA DISCHARGE
Stephen W. Osborn, Yardley, and Edward Broderick, Perkasie, Pa., assignors to Thiokol Chemical Corporation, Bristol, Pa., a corporation of Delaware
No Drawing. Filed June 1, 1966, Ser. No. 554,311
Int. Cl. C07c 3/24; B01k 1/00
U.S. Cl. 204—169                                      5 Claims

ABSTRACT OF THE DISCLOSURE

Polymeric products containing a substantial amount of saturated components are obtained from tetrafluoroethylene, hexafluoropropylene, chlorodifluoromethane, and mixture thereof by subjecting these compounds to a corona discharge supported by electrodes spaced to define a gap of no more than five millimeters at a power density of .01 to 5 watts per square centimeter of the average surface area of both of the electrodes.

---

The present invention relates to novel polymeric halocarbon oils, greases, waxes and solids of higher softening or melting point and the novel process for producing such materials. More particularly the present invention relates to the preparation of such polymeric halocarbon materials using a corona discharge process.

An object of the present invention is to provide novel polymeric halocarbon compositions which may be used as intermediate compositions for the preparation of derivative compositions or more refined compositions which have many valuable commercial applications.

A further object of the present invention is to provide a unique corona discharge process whereby the novel polymeric halocarbon compositions of the present invention may be readily prepared in relatively large yields.

The novel compositions of the present invention are prepared by subjecting one or more of a certain class of simple halocarbons to a cold electric discharge (corona discharge) under the conditions set forth below. The term simple halocarbon refers, in the instant application, to certain compounds which may be either saturated or unsaturated. To be useful in the preparation of the desired products, the simple halocarbon compounds must be capable of existing in a gaseous state under the reaction conditions being employed, as discussed below.

The unsaturated simple halocarbons contain up to about nine carbon atoms and one or more carbon to carbon double bonds, regardless of the type of such unsaturated groupings. The preferred of such unsaturated compounds are perhalogenated compounds such as tetrafluoroethylene, hexafluoroethylene, octafluorobutene-1, octafluorobutene-2, octafluoroisobutylene, perfluoro-2,4, dimethyl heptene-3, tetrachloroethylene, tetrabromoethylene, chlorotrifluoroethylene, bromotrifluoroethylene and dichlorodifluoroethylene.

Other unsaturated simple halocarbons which may be used in the novel process of the present invention include compounds which are not perhalogenated such as vinyl fluoride, vinyl chloride, vinyl bromide, vinyl iodide, vinylidene fluoride, vinylidene chloride, vinylidene bromide, trifluoroethylene, tribromoethylene, trichloroethylene, allyl chloride, allyl fluoride, allyl bromide and any of the dichlorobutene-2 isomers.

The saturated simple halocarbons which may be used in the novel process of the present invention contain one to three carbon atoms which are substituted with two or more different atoms which may be hydrogen or any one or combination of the halogen atoms. Examples of such saturated simple halocarbons are monochlorodifluoromethane,
dichlorodifluoromethane,
trifluoromethane,
monochlorotrifluoromethane,
dichlorotetrafluoroethane,
monobromodifluoromethane and
dibromodifluoromethane.

The simple halocarbons may be used alone or in combination with one another in various combinations thereof in the novel process of the present invention. Particularly useful mixtures of this type are mixtures of tetrafluoroethylene and hexafluoropropylene, and more particularly, such mixtures containing substantial amounts of these two perhalogenated olefins as are produced during the pyrolytic decomposition of the saturated simple halocarbons described above. The pyrolysis of these saturated simple halocarbons is a means of producing perhalogenated olefins such as tetrafluoroethylene and hexafluoropropylene. The pyrolysis product mixtures will contain in addition to substantial amounts of tetrafluoroethylene and hexafluoropropylene small amounts of the other simple halocarbons described above so that such mixtures can be used as such in the present process without having any deleterious effect on the desired results.

The novel process of the present invention involves subjecting the above described simple halocarbons in a gaseous state to a corona discharge, i.e., a cold electric discharge, having an electrical frequency ranging from zero to 10,000 cycles per second under certain conditions (zero cycles being direct current). A corona discharge connotes, according to the present invention, the passage of an electric current between two conducting electrodes, which electrodes are separated by at least one dielectric barrier. The dielectric barrier may be a solid nonconducting material such as glass, and preferably Pyrex glass, quartz, alumina, silica and other ceramic materials commonly employed as dielectric media. Under certain conditions, i.e., low pressure (less than about 10 mm. Hg), the simple halocarbons, themselves, in gaseous form may constitute the dielectric barrier. According to the novel process of the present invention, the simple halocarbons are subjected to the corona discharge at a reaction chamber wall temperature of about 0 to 300° C. and at a pressure of at least 1 mm. Hg. The temperature of the gaseous simple halocarbons in the reaction chamber may be up to 1000° C. during the course of the reaction. The corona discharge is regulated in such a way that about 1 to 30 kilowatts of electrical power are utilized in the preparation of each pound of product. The voltage required for operation of the discharge device will depend upon the particular configuration of the discharge device, the thickness of dielectric barrier(s) and the gaseous gap, the temperature and pressure of the gas, and the composition of the gas. Typically, the required voltage may vary from about 300 volts to above 30,000 volts (R.M.S.). In any event, the power density should be 0.01 to 5 watts/cm.$^2$ of electrode area. (Electrode area being taken as the arithmetric average of the areas of the two electrode surfaces.) The gap between the electrode surfaces may contain one or more solid dielectric barriers as indicated above, or the gaseous simple halocarbon may act, itself, as such a barrier. The gap between the electrodes which is available for the passage of gaseous simple halocarbon therebetween should be up to about 5 millimeters in width. The process may be conducted continuously or batchwise, but a residence or contact time of about one second to 30 minutes should be utilized in bringing the simple halocarbons into contact with the corona discharge. The preferred residence time is about 15 seconds to 4 minutes.

The reaction chamber shoud be devoid of any inert gases which would interfere with the maintenance of the desired pressure by the simple halocarbons.

A closed reaction system may be advantageously used in carrying out the novel process of the present invention with the unsaturated simple halocarbons. In such an arrangement, the simple halocarbon, in gaseous form, is automatically fed from a reservoir into the reaction chamber by means of an inlet valve which responds to a drop in pressure in the otherwise sealed reaction chamber through which the corona discharge passes. The drop in pressure in the reaction chamber is caused by the transformation of gaseous simple halocarbon into liquid or solid polymer product in the reaction chamber after the simple halocarbon passes through the corona discharge. The polymer product collects on the inner walls of the reaction chamber and, if liquid, falls to the bottom thereof from where it may periodically be removed through a stopcock or other such device. The solid products tend to collect on the walls of the reaction chamber and may be periodically removed therefrom by scraping. Based on the weight of charged simple halocarbon, the novel process of the present invention provides yields of the order of 100%, i.e. essentially quantitative yields, particularly when using the unsaturated simple halocarbons in a closed system.

The desired pressure is supplied to, and maintained in, the reaction chamber by means of the pressurized feed of gaseous simple halocarbon.

Where heating or cooling of the reaction chamber is desired, it may be supplied by conventional heat exchange means in which a heat exchange fluid is circulated through jackets which are in contact with the electrodes and/or walls of the reaction chamber. Each electrode and its separate cooling system should be electrically isolated from the other electrode and its cooling system.

The products formed by the novel process of the present invention are liquid or solid, at 25° C., compositions which are composed of a plurality of different polymeric halogenated compounds which have a $C_2$ to about $C_{60}$ or higher carbon content. They will also contain, dissolved therein, unreacted simple halocarbons.

The polymeric halocarbon products are composite materials containing both saturated and unsaturated components. The components have boiling points of about 35° C. and higher. The components may be linear or branched polymers. The polymers need not contain repeating units of the simple halocarbons since both hydrogen and halogen molecules may be evolved during the treatment of the saturated simple compounds and structural rearrangements and cleavages will take place with respect to both the saturated and unsaturated simple halocarbons during the corona discharge treatment thereof.

The polymeric halocarbon components can be separated physically and chemically. Physically they can be most readily separated by means of their boiling point properties. Distillation of the composite materials also allows for the recovery of the unreacted simple halocarbons. The fractions having a boiling point of below about 100° C. are useful as low boiling solvents for, among other things, fluorocarbon polymers. The fractions having boiling points of from about 100° C. and 250° C. are useful as nonflammable lubricants and hydraulic fluids and the fractions having boiling points above 250° C. are useful as liquid or solid lubricants.

The components of the composite compositions may also be separated chemically as derivatives of various reactants. Certain fractions of the polymeric halocarbon products are alkali soluble or alkali reactive. These reactive fractions are believed to be composed essentially of carboxylic acid or acid precursor components. Water soluble potassium, sodium, lithium, ammonium, etc. salts, therefore, are thus readily formed from this fraction. The acids have utility as emulsifiers in various emulsion polymerization systems.

After the removal of the acidic components, the remainder of the polymeric halocarbon products may then be treated with other reagents such as glycols or alcohols in a base catalyzed reaction to form alcohol adducts. The alcohols used in this regard include methanol, ethanol, trifluoroethanol, and higher fatty alcohols and polyols. The alcohol adduct products may be recovered by distillation and are useful as lubricants, damping fluids and hydraulic fluids.

The residue after removal of the alcohol adduct products is composed primarily of relatively inert polymeric halocarbons which are substantially resistant to oxidation. These inert polymeric halocarbon fractions can be fractionated according to their boiling points and used as solvents, lubricants and hydraulic fluids as indicated above.

Where hexafluoropropylene is used as the simple halocarbon material in the process of the present invention, the polymeric product contains about 10 to 25% by weight of components having a boiling point of up to about 100° C., about 30 to 60% by weight of components having a boiling point of about 100 to 250° C. and the residue being components having boiling points over 250° C. The product formed using hexafluoropropylene as the simple halocarbon starting material contains about 30% or more by weight of polymeric components which are unsaturated as evidenced by the fact these fractions can be chemically separated by reaction of the crude polymeric product with an alcohol in a base catalyzed reaction followed by fractional distillation of the unreacted fractions with steam. Prior to reaction with alcohols the crude polymeric product formed from hexafluoropropylene shows absorption in the 5.3 to 5.8$\mu$ infrared region. The steam distilled fractions, which are unreacted (with alcohol) fractions show no absorption in the infrared region below 7$\mu$.

The polymeric product formed using hexafluoroethylene as the simple halocarbon also contains about 20% or more by weight of fractions which react with or dissolve in aqueous alkali. The resulting water soluble salts, such as the ammonium salts have surface tension reducing properties. When, for example, 0.1% by weight of the ammonium salts are dissolved in water the surface tension of the resulting solution is the range of 15 to 45 dynes/square centimeter.

The inert polymeric halocarbons formed according to the process of the present invention using hexafluoropropylene as the simple halocarbon and which are recovered after the removal of the alkali soluble and alcohol reactive fractions amounts to about 25 to 35% by weight of the original polymeric halocarbon composition.

The following examples are merely illustrative of the concepts of the present invention and are not intended as a limitation upon the scope thereof.

EXAMPLES 1 TO 3

A concentric tube type corona discharge cell is prepared having an outer quartz tube with an inside diameter of 35.5 mm. and an inner quartz tube with an outside diameter of 29 mm. The gap between the tube walls through which the corona discharge is to pass is thus 3.25 mm. The outside of the outer quartz tube is painted with silver paint to form an electrode 220 mm. long. The inner quartz tube contains an inlet and outlet for circulation of cooling medium and is connected to a source of alternating or direct current. The outside tube is wrapped with a cooling jacket and has an inlet side arm which is attached to a source of hexafluoropropylene. The bottom end of the outside quartz tube is attached to a collection flask in order that the polymeric product may be collected and at the same time providing a closed system that will not allow the reactant gases to escape.

Hexafluoropropylene (HFP) is fed into the quartz corona discharge cell by means of a feed inlet solenoid valve which is activated by a drop in pressure in the reactor. The corona cell is operated for daily runs of approximately 12 hours duration. The yields were essentially quantitative, i.e. of the order of 100%. The conditions and results of three different runs are summarized as follows:

| Example | Frequency (cycles/ sec.) | Pressure (mm. Hg) | Total reaction time (hours) | Average power (watts) | Total energy consumed (kw. hrs.) | Weight or product (grams) | Kw. hr./ kg. of product |
|---|---|---|---|---|---|---|---|
| 1 | 1,440 | 236 | 40.50 | 125.8 | 5.10 | 627.1 | 8.15 |
| 2 | 1,440 | 436 | 31.25 | 151.8 | 4.75 | 641.8 | 7.40 |
| 3 | 1,440 | 760 | 28.25 | 100.3 | 2.83 | 522.0 | 4.52 |

The products thus produced are fractionated as follows:

| | Percentage by Weight of Composition | | |
|---|---|---|---|
| Boiling Point [1] (° C.) | Example 1, percent | Example 2, percent | Example 3, percent |
| 55-87 | 7.3 | 9.8 | 19.0 |
| 87-119 | 3.8 | 12.6 | 16.0 |
| 119-155 | 26.0 | 24.4 | 19.9 |
| 155-202 | 19.1 | 17.2 | 15.8 |
| Above 202 (residue) | 43.8 | 36.0 | 29.3 |
| Total | 100.0 | 100.0 | 100.0 |

[1] This temperature is that of the vapor in the distillation flask at atmospheric pressure.

Ten grams of the fraction of polymeric reaction product of Example 2 having a boiling range of 155 to 202° C. 10 grams of $KMnO_4$, 2 grams of KOH, and 50 ml. of water are charged to a reaction flask. The alkaline $KMnO_4$ oxidizes acid precursors to form carboxylic acids. The admixture was heated to reflux with stirring for 3 days. After cooling, the reaction mixture was filtered and the filtrate was evaporated to dryness in a vacuum oven at 90° C. The residue from the filtrate was extracted with ethanol and the ethanol solution was evaporated to dryness yielding 2.1 grams of waxy solid acid material which readily dissolves in water with considerable foaming. This waxy product or the ammonium salts thereof may be used as surfactants for the emulsion polymerization of tetrafluoroethylene.

EXAMPLE 4

Gaseous hexafluoropropylene is fed into a corona discharge cell such as described in Examples 1 to 3 except that the inner tube and outside tube are made of Pyrex instead of quartz. The reaction is allowed to proceed under the following conditions: pressure of 236 mm. Hg, average voltage of 17,500 volts, frequency of 1440 cycles per second, and average power input of 400 watts for 59.5 hours. The outside tube of the corona cell is cooled with an ice bath. 2542 grams of a liquid polymeric product (an essentially quantitative yield) is obtained which is fractionated by fractional distillation as follows:

Vapor temperature [1] (° C.):     Percentage of composition by wt.
Up to 140 _____ 42.6
140–200 _____ 39.6
Above 200 (residue) _____ 17.8

[1] At atmospheric pressure.

During the reaction in a closed system the gas residence time was 55.5 seconds and the power density was 0.89 watt per square centimeter.

EXAMPLE 5

A quartz corona discharge cell as in Examples 1 to 3 (except that the silver painted electrode is reduced from 220 mm. in length to 64 mm. in length) is charged with gaseous hexafluoropropylene. The reaction proceeds at 24,200 volts and 159 watts for 51 hours to give 581.6 grams of a liquid product (an essentially quantitative yield). The product was fractionated by fractional distillation as follows:

Percentage by weight of composition
Volatiles _____ 14.9
Fraction up to 87° C. _____ 20.3
Fraction 87–119° C. _____ 14.4
Fraction 119–155° C. _____ 21.7
Fraction 155–202° C. _____ 12.7
Fraction above 202° C. (residue) _____ 16.0

During the reaction in a closed system the gas residence time was 37.6 seconds, the power density was 2.48 watts per square centimeter and the pressure was 760 mm.

EXAMPLE 6

A quartz corona discharge cell such as used in Example 1 to 3 is purged with nitrogen gas and then swept with tetrafluoroethylene for ½ hour. Tetrafluoroethylene is then fed into the corona discharge cell as the reaction is conducted for 2¾ hours under the following conditions: pressure of 760 mm. Hg, voltage of 17,500 volts, power input of 7.5 watts, and a frequency of 1440 cycles per second. A waxy product is formed in essentially quantitative yields in the collection flask. During the reaction in the system the gas residence time was 120 seconds and the power density was 2.48 watts per square centimeter.

EXAMPLE 7

Tetrafluoroethylene is fed into a corona discharge cell such as used in Example 6 for 21 hours as the reaction is conducted at a pressure ranging from 760 to 1000 mm. of Hg, at a frequency of 1440 cycles per second, and at a power input of 21 watts. Thirteen grams of liquid product was obtained (an essentially quantitative yield) in the collection flask. During the reaction in a closed system the gas residence time was 1600 seconds and the power density was 0.1 watt per square centimeter.

EXAMPLE 8

A Pyrex corona discharge cell such as used in Example 4 is used to react tetrafluoroethylene. The reaction is conducted for 6.25 hours at a pressure of 236 mm. Hg, a frequency of 1440 cycles per second, and at a power input of 428 watts. Coolant for the inner tube is maintained at an inlet temperature of 5° C. and at an outlet temperature of 32.2–33.3° C. Coolant for the outer tube is maintained at an inlet temperature of 9° C. and an outlet temperature of 16–18° C. 101.0 grams of a liquid product having a viscosity at 20° C. of 8.6 cs. is collected from the bottom of the cell and 4.6 grams (an essentially quantitative yield) of waxy material is collected from the walls of the cell. During the reaction in a closed system the gas residence time was 97.7 seconds and the power density was 0.95 watt per square centimeter.

EXAMPLE 9

A reactant gas composed of 24.4 mol percent of tetrafluoroethylene and 75.6 mol percent of hexafluoropropylene is fed into a Pyrex corona discharge cell such as used in Example 4. The reaction is allowed to proceed under the folowing conditions: pressure of 236 mm. Hg, voltage of 17,500 volts, frequency of 1440 cycles per second, and at an average power input of 484 watts for 8¾ hours. The inlet temperature of the coolant for the inner tube is 12° C. and the outlet temperature is varied from 31.1 to 35.6° C. The coolant for the outside tube has an inlet temperature of 9° C. and an outlet temperature of 17 to 18° C. 216.5 grams (an essentially quantitative yield) of liquid product are collected in the collection flask. The viscosity of the product at 20° C. is 6.575 cs. During the reaction in a closed system the gas residence time was 88.5 seconds and the power density was 1.07 watts per square centimeter.

EXAMPLE 10

A reaction gas mixture consisting of 10.6 mol percent tetrafluoroethylene and 89.4 mol percent of hexafluoropropylene is fed into a Pyrex corona discharge cell such as used in Example 4 and the reaction is allowed to proceed under the following conditions: pressure of 236 mm. Hg, voltage of 17,700 volts, frequency of 1440 cycles per second, and at an average power input of 487 watts for 8¼ hours. Coolant for the inner tube had an inlet temperature of 5° C. and an outlet temperature of 32.2 to 34.4° C. Coolant for the outer tube had an inlet temperature of 9° C. and an outlet temperature of 16 to 18° C. 193.8 grams (an essentially quantitative yield) of a liquid product having a viscosity of 6.76 cs. at 20° C. is obtained. During the reaction in a close system the gas residence time was 98 seconds and the power density was 1.08 watts per square cetimeter.

EXAMPLE 11

A reactant gas mixture composed of 56.3 mol percent of tetrafluoroethylene and 43.7 mol percent of hexafluoropropylene is reacted in a Pyrex corona discharge cell under the conditions described in Example 10 for 8.0 hours. 180.0 grams (an essentially quantitative yield) of liquid product having a viscosity of of 6.7127 cs. at 20° C. are obtained. During the reaction in a closed system the gas residence time was 85.5 seconds.

EXAMPLE 12

A comparison is made between a "closed system" wherein 100% of the reactant is converted to product and a "flow system" wherein a much lower percent conversion of reactant to product is obtained. The "closed system" which is used is a quartz corona discharge cell such as described in Examples 1 to 3. In this "closed system" a pressure drop in the reactor activates the feed inlet valve which allows reactant gases to enter the reactor thereby maintaining the pressure. The "flow system" which is used is a quartz corona discharge cell such as is used for the "closed system" of this example except that the bottom end of the outside tube of the corona discharge cell is attached to a collection flask in such a way that the reactant gases pass into the atmosphere or are recycled through the reactor. The reaction conditions of the two systems are summarized as follows:

and an inner tube composed of stainless steel and having an electrode gap of 2 mm. and an electrode length of 254 mm. is used to react hexafluoropropylene. The reaction is carried out at a pressure of 760 mm. of Hg at an average voltage 25,000 volts, at a frequency of 1440 cycles per second, with a coolant bath for the outer electrode having a temperature of 20 to 40° C., and at an average power density of from 0.60 to 0.77 watt/cm.[2]. A liquid product having a viscosity of 20° C. of less than 2.0 cs. is produced. When the above reaction is carried out at 236 mm. of Hg of pressure at an average voltage of 20,000 volts, at a frequency of 1440 cycles per second, with a coolant bath for the outer electrode of 45° C., and at an average power density of 1.68 watts/cm.[2], a liquid product is produced in essentially quantitative yields having a viscosity at 20° C. of 4.80 cs.

EXAMPLE 14

Chlorodifluoromethane was subjected to a corona discharge in a cell having the structure of the corona discharge cell used in Examples 1 to 3 under the following conditions: pressure of 760 mm. Hg, average voltage of 16,500 volts, frequency of 1440 cycles per second, and average power input of 14.6 watts. At the end of 6¾ hours a liquid product had collected in the collection flask.

In Examples 1 to 3 during the discharge reaction the gas flow rate was 75 ml/minute through the center of the reaction chamber. The cooling medium had an inlet temperature of 12° C. The temperature of the wall of the inner tube was 68 to 78° C. The outer electrode area was air cooled. The power densities (watts/square centimeter) and gas residence times (seconds) in Examples 1 to 3 were, respectively: (power densities) 0.57, 0.68 and 0.45 and (gas residence times) 29.5, 43.5 and 81.0.

We claim:

1. A process for preparing polymeric halocarbons containing a substantial amount of saturated components in high yield comprising subjecting at least one simple halocarbon selected from the group consisting of tetrafluoroethylene, hexafluoropropylene, chlorodifluoromethane and mixtures thereof in a gaseous state to a corona discharge in a gap of up to about 5 millimeters between two electrodes while utilizing an electric current frequency of about zero to 10,000 cycles per second and a residence time of between about one second to thirty minutes at a power density of about .01 to 5 watts per square centimeter of the average surface area of both of said electrodes at a pressure of 1 to 1000 millimeters/Hg and a temperature of up to 1000° C.

2. A process as in claim 1 in which at least one of said simple halocarbons is tetrafluoroethylene.

3. A process as in claim 1 in which at least one of said simple halocarbons is hexafluoropropylene.

FLOW SYSTEM

| Inlet gas composition (Mol. percent) | Cell wall temp. (° C.) | Gas pressure (mm. Hg) | Operating voltage (k.v.p.) | Frequency (cycles/sec.) | Operating power (watts) | Reaction time (min.) | Gas flow rate (cc./min.) | Gas residence time (sec.) [3] | Production rate (grams/hour) | Yield (percent) [4] | Energy input (Kwh./lb.) |
|---|---|---|---|---|---|---|---|---|---|---|---|
| 100 HFP [1] | 50-60 | 770 | 31 | 10,000 | 444 | 80 | 1,000 | 1.9 | 22.8 | 6.2 | 8.8 |
| CLOSED SYSTEM | | | | | | | | | | | |
| 100 HFP | 50-60 | 760 | 31.5 | 10,000 | ([5]) | 60 | [2] 126 | 15 | 41.5 | 100 | 3.4 |

[1] Hexafluoropropylene.
[2] Gas flow rate for the "closed system" (100% conversion) is calculated as per the following formula:

$$\text{Flow rate} = \frac{\text{G. product/reaction time}}{\text{Mol. wt. HFP}} \cdot \frac{(22,400)(760)}{\text{Cell pressure}} \cdot \frac{\text{Cell temp. (° K.)}}{273}$$

[3] Residence time was calculated from interelectrode volume of the cell (31 cc.), divided by gas flow rate under the operating conditions.

[4] $\text{Yield} = \frac{\text{Grams/hr. of product}}{\text{Grams/hr. of HFP input}} \cdot 100$.

[5] 275 for 44 min. and 404 for 16 min.

EXAMPLE 13

A corona discharge cell similar to that described in Examples 1 to 3 having an outer tube composed of Pyrex 4. A process as in claim 1 in which said simple halocarbon is a mixture of tetrafluoroethylene and hexafluoropropylene.

5. A process as in claim 1 in which at least one of said simple halocarbons is chlorodifluoromethane.

References Cited

UNITED STATES PATENTS 2,676,145  4/1954  Weisz et al. _____ 204—169
3,081,245  3/1963  Farlow _____ 204—169

OTHER REFERENCES

Thornton et al., J.A.C.S., vol. 55, 1933, pp. 3177–82.

ROBERT K. MIHALEK, Primary Examiner

U.S. Cl. X.R.

204—165